United States Patent
Roos

(10) Patent No.: US 6,577,882 B1
(45) Date of Patent: Jun. 10, 2003

(54) ARRANGEMENT AND A METHOD RELATING TO POWER SUPPLY IN A COMMUNICATIONS NETWORK

(75) Inventor: Sture Roos, Bergshamra (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/410,035

(22) Filed: Oct. 1, 1999

(30) Foreign Application Priority Data

Sep. 24, 1999 (SE) .............................................. 9903476

(51) Int. Cl.$^7$ .............................. H04B 1/38; H04M 1/00
(52) U.S. Cl. ...................... 455/572; 455/424; 379/413; 379/322; 379/323; 379/279
(58) Field of Search ................................. 455/572, 573, 455/574, 423, 424, 405, 406, 407, 408; 379/32.01, 32.02, 32.04, 106.04, 221.03, 221.04, 322–327, 9, 9.05, 56.2

(56) References Cited

U.S. PATENT DOCUMENTS

| | | | | |
|---|---|---|---|---|
| 5,696,817 A | * | 12/1997 | Yatsu ......................... | 379/252 |
| 5,717,751 A | * | 2/1998 | Yagi et al. ............. | 379/373.01 |
| 5,729,197 A | * | 3/1998 | Cash .......................... | 340/539 |
| 5,912,963 A | * | 6/1999 | Begeja et al. .......... | 379/221.01 |
| 5,960,358 A | * | 9/1999 | Fujikura et al. ............ | 455/562 |
| 6,028,916 A | * | 2/2000 | Beveridge .................. | 379/56.2 |

* cited by examiner

*Primary Examiner*—Edward F. Urban
*Assistant Examiner*—Temica M Davis

(57) ABSTRACT

A method and an arrangement supplies power in a communications network (100) comprising subscriber side (110) and a provider side (120), the provider side being connected to nodes of the subscriber side through one or more Line Terminals ($LT_1$, . . . , $LT_n$) and at least one equipment (111–114) at the subscriber side (110) being connected to the provider side (120) through at least one Net Terminal (NT). The arrangement comprises apparatus for supplying power to the communications network (100) at least during a period of time through the at least one Net Terminal from the at least equipment (111–114).

13 Claims, 2 Drawing Sheets

ARRANGEMENT AND A METHOD RELATING TO POWER SUPPLY IN A COMMUNICATIONS NETWORK

This applications claims priority under 35 U.S.C. §§1999 and/or 365 to 9903476-1 filed in Sweden on Sep. 24, 1999; the entire content of which is hereby incorporated by reference.

TECHNICAL FIELD OF THE INVENTION

The present invention relates to a method and an arrangement for supplying power in a communications network. The network comprises a subscriber side and a provider side. The provider side is connected to the subscriber side through one or more Line Terminals and at least one equipment at the subscriber side can be connected to said provider side through at least one Net Terminal.

BACKGROUND OF THE INVENTION

Telecommunication equipments and so-called access nodes tend to move closer to the user and subscribers of the telecommunication network. In the networks based on copper lines, there are provided natural locations for arranging the equipments, generally at the joining points of the conductors or distribution cabinets. Usually, at these points there are no line voltages, generally of AC type, supplied. Supplying the line voltage to these points is usually not a major technical problem but it involves high costs, burdening partly subscription fees and partly the consumption charges. When the equipment moves closer to the subscriber, the number of the access nodes increases, which results in an accentuated problem.

Yet another problem is that the equipment requires some kind of backup unit, usually a battery backup, in case there are disturbances in the distribution of the line voltage.

Presently, more and more subscribers use Net Terminals at their side, which are powered by AC mains voltage or connect equipments powered by AC; Said Net Terminals besides telephones, computers, modems etc. also include, for example battery-powered mobile telephones which are recharged through chargers connected to the mains voltage.

PRIOR ART

The prior art poorly discloses power supply to a network from a subscriber/client/user side, however, supply some kind of devices in a network is known:

For example, WO 94/15424 relates to a system for providing voltage to a common line for a plurality of electrical units, each of which comprises a power supply unit for supplying power to electrical circuits of the electrical unit and to a common voltage lines. A switch is provided between the power supply unit and the voltage line to be in such position while the power supply unit is in operation that the power supply unit supplies power to said voltage lines, and in another position while the power supply unit is not in operation, whereby at least some of the electrical circuits of the electrical unit take voltage from said common voltage line. The aim of this invention is to provide a reliable and accurate voltage supply to the common line and specially in telecommunications systems for providing auxiliary voltage to interface circuits of plug-in units.

In EP-A2-887 331 a data transmission system is used between a mobile source and a stationary or a mobile reception device, each provided with a data transmitter and receiver, a control and a memory and coupled to a sensor and/or actuator. When the normal energy supply for the reception device, or the reception device and the sensor and/or the actuator fails, the operating energy may be provided by an energy transmitter and a cooperating energy receiver.

According to EP-A2-863 652, a media selection device is in functional parallel with an alternate local telephone network and an existing local telephone network. Upon detecting a loss of local power, the device switches to the local exchange network based on the assumption that the local exchange network is operable, despite the loss of local power. While power is supplied to the device, originating calls are transmitted from the telephone to the device and to the alternate network. Incoming calls from the alternate network are transmitted to the device and to the telephone.

SUMMARY OF THE INVENTION

The main object of the present invention is to provide an arrangement, which enables supplying a communications network, preferably a telecommunications network and specially an access node with power, normally AC power, from at least one user or subscriber side.

Another object of the present invention is to provide an arrangement for supplying the communications network specially during power failures with power, whereby the need for battery backups is reduced or eliminated. Consequently, a need for costly larger backup stations and related cost of maintenance are eliminated.

For these reason the initially mentioned communications network is supplied with power, at least during a period of time, through said at least one Net Terminal by means of said at least one equipment.

Said period of time is specially a power supply failure period and the Net Terminal comprises means to sense a power failure and means to switch power supply from subscriber side onto the network. Moreover, also the Line Terminal comprises means to sense a power failure and means to switch power supply from subscriber side.

Preferably, the equipment is one or several of moderns, telephones, telephone battery recharges, facsimile apparatus, computers and/or power supply of them.

Advantageously, the subscriber location includes a local power backup.

In one embodiment the power supply is substantially continues. The communications network is one of a Public Switched Telephone Network (PSTN), Integrated Services Digital Network (ISDN) or Asymmetrical Digital Subscriber Line (ADSL).

in one embodiment, the arrangement is arranged to connect a mobile station of wireless communications network to said communications network when the mobile station supplies said communications network with power.

According to a method for supplying power in a communications network comprising a subscriber side and a provider side, said nodes of provider side are connected to said subscriber side through one or more Line Terminals and at least one equipment at said subscriber side are connected to said provider side through at least one Net Terminal. The method comprises the steps of supplying said communications network with power at least during a period of time through said at least one Net Terminal by means of said at least one equipment. It may also comprise the step of supplying power during a power supply failure period of substantially continuously.

To attract the subscribers to supply power to the network the method comprises creating an attraction value for a subscriber of the communications network to connect a device for supplying the communication network.

BRIEF DESCRIPTION OF THE DRAWINGS

In the following, the invention will be further described in a non-limiting way with reference to the accompanying drawings, in which.

DETAILED DESCRIPTION OF THE EMBODIMENT

Figure 1:
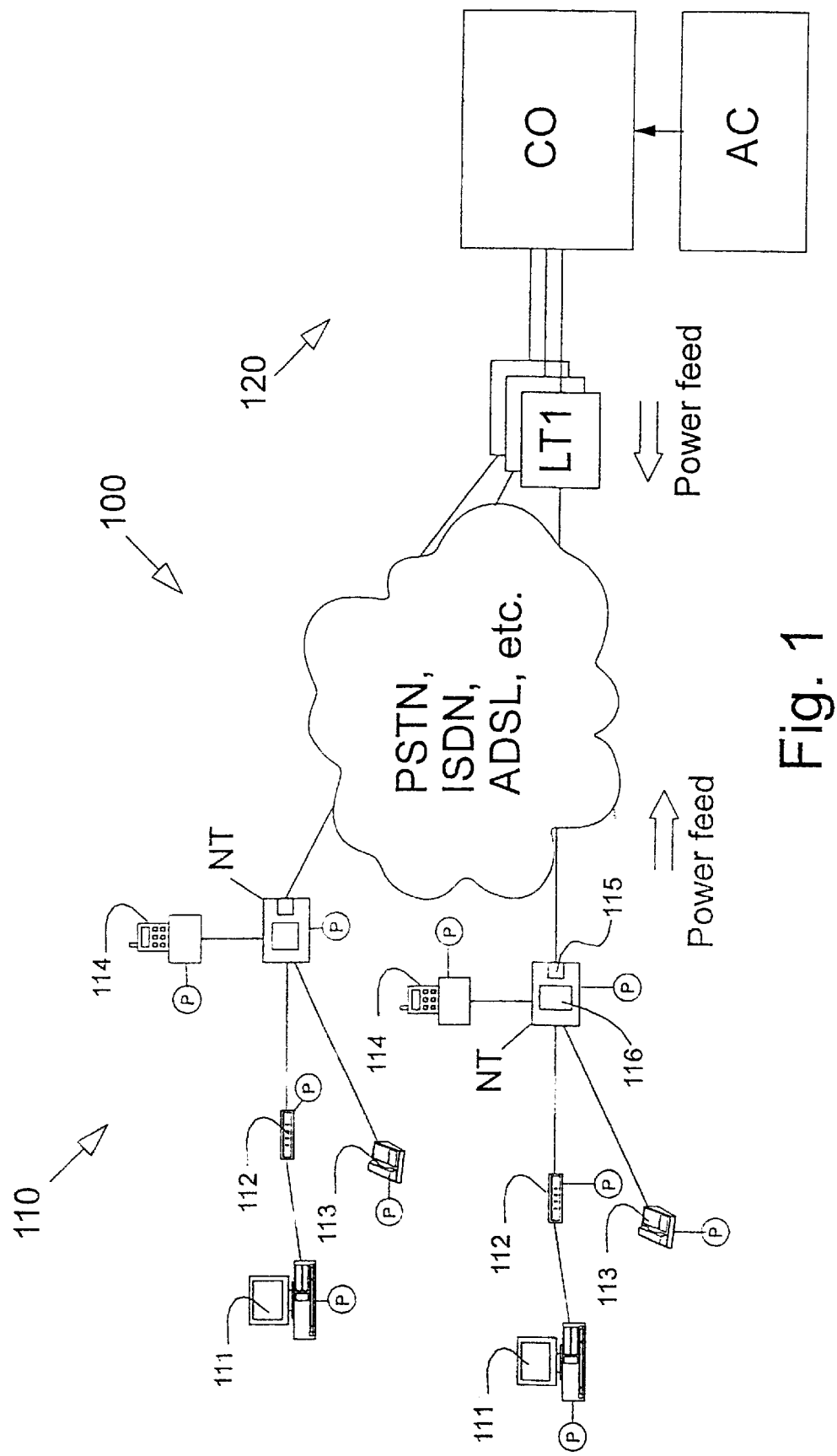
FIG. 1 is a schematic illustration of a communications network employing the arrangement of the invention.

A communications network 100 is illustrated in FIG. 1, comprising a subscriber side 110 and a central office CO side 120. The CO is supplied with power from a power station AC, preferably AC mains voltage adapted to the CO and network needs.

The CO is connected to the network through Line Circuits or Line Terminal, $LT_i$ (where i=1, 2, . . .). The network may be any of a Public Switched Telephone Network (PSTN), Integrated Services Digital Network (ISDN), Asymmetrical Digital Subscriber Line (ADSL), etc.

The subscriber site 110 may comprise different types of communication devices, such as computer units 111 connected to the network through modems 112, telephone units 113, mobile/cordless phones 114, fax machines etc. The connection to the network is provided through Net Terminals NT. Each equipment is provided with a power feed P, which may comprise AC or DC power supply.

According to the invention power is supplied to the network, and specially the nodes from the NTs of each or all subscriber sites, instead of supplying power from the access nodes to the user nodes. In one embodiment of the invention the network is supplied with power from the subscriber site only if the main power supply of the network, i.e. AC at CO fails. In another embodiment the network is continuously supplied with power from the subscriber side. Of coarse the power from supplied to the subscriber equipments can be processed to adapt to the network requirements, i.e. voltage level, current amperage, AC or DC voltage etc.

For this reason, each (or some) NT at subscriber site(s) is (are) provided with a detector 115, which detects a power failure at the node, and a connection device 116, which redirects or connects power through the NT to the node. The detector may comprise any type of sensor that detects a voltage or current reduction below a threshold value. Examples of such sensors are opto-switches, transistor network, A/D-convertors with control units etc. Also, the connecting/redirecting device may comprise any device, such as transistors, circuit breakers, relays, micro-switches etc., that upon receiving a signal from a control unit, switch the power to a specific line.

Figure 2:
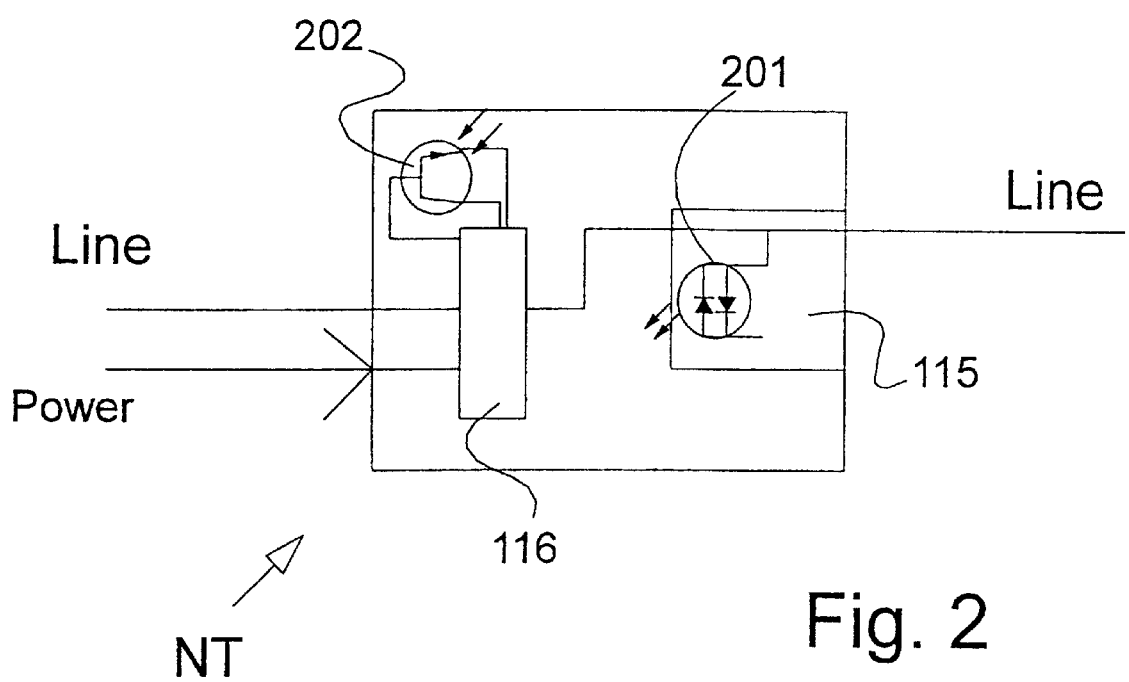
FIG. 2 illustrates a very schematic block diagram of a Net Terminal according to the invention.

An exemplary embodiment of a NT arrangement with the sensor 115 and connection device 116 is illustrated in FIG. 2. However, it is to be understood that the invention is not limited to this embodiment. For example, other arrangements, such as those mentioned above, may occur. The sensor 115 comprises a photo-diode 201, which emits a light when a current, in this case from the line connected to the node is passed through it. The emitted light is detected by a second photo detector 202, which is arranged to generate a signal upon the absence of the light emitted by the diode 201. The generated signal, i.e., due to power failure detected on the in LINE, couples the LINE to the power provided through an equipment at the subscriber side, which feeds the node. Obviously, according to the second aspect of the invention in which the network is continuously fed from the NT, sensors and connection means are unnecessary.

In the same way, the LTs at the provider side 120 can be provided with means to detect power failure and connection means to connect the power supplied from the subscriber side back to the CO and/or other LTs and thus other subscribers which do not have power supply or suffer from the power failure.

Through the present invention, the nodes of a communications network will be provided with several distributed power supply points. If the entire power mains fails, the power is fed through the subscribers equipment connected to the network, specially Net Terminals such as base stations of the wireless telephones (e.g., DECT:Digital Enhanced Cordless Telecommunications) combined or provided with recharges and rechargers of the mobile telephone sets etc., may be equipped with the service according to the invention. It is also possible to increase a subscriber's will to connect equipment for power supplying to the network, e.g. a subscriber of a mobile phone or the like, by providing the battery recharger of the mobile phone with a function, which also connects the mobile phone to the PSTN through telephone jack when it is recharged, to reduce the call fees.

Furthermore, as the battery backup at CO is eliminated or reduced, the overall costs of the network can be reduced and the subscribers may obtain a discount on the fees if they connect special equipments to feed the network.

In a large office block, the switching equipment may be provided with locally arranged battery backups which stores energy and supplies the network with the stored energy upon power failure.

The invention is not limited the shown embodiments but can be varied in a number of ways without departing from the scope of the appended claims and the arrangement and the method can be implemented in various ways depending on application, functional units, needs and requirements etc.

What we claimed is:

1. An arrangement for supplying power in a communications network comprising a subscriber side and a provider side, said provider side being connected to nodes of said subscriber side through one or more Line Terminals and at least one equipment at said subscriber side being connected to said provider side through at least one Net Terminal, wherein the arrangement comprises means for supplying power to said communications network at least during a period of time through said at least one Net Terminal from said at least one equipment.

2. The arrangement according to claim 1, wherein said period of time is a power supply failure period.

3. The arrangement according to claim 2, wherein said at least one Net Terminal comprises means to sense a power failure and means to switch power supply from said subscriber side.

4. The arrangement according to claim 2, wherein said at least one Line Terminal comprises means to sense a power failure and means to switch power supply from said subscriber side.

5. The arrangement according to claim 1, wherein said at least one equipment is one or several of modems, telephones battery rechargers, facsimile apparatus, computers and/or power supply of them.

6. The arrangement according to claim 1, wherein said subscriber location includes a local power backup.

7. The arrangement according to claim 1, wherein said power supply is substantially continuous.

8. The arrangement according to claim 1, wherein said network is one of a Public Switched Telephone Network (PSTN), Integrated Services Digital Network (ISDN) or Asymmetrical Digital Subscriber Line (ADSL).

9. The arrangement according to claim 1, wherein the arrangement is adapted to connect a mobile station of a wireless communication network to said communications network such that the mobile station supplies said communications network with power.

10. A method for supplying power in a communications network comprising a subscriber side and a provider side, said provider side being connected to nodes of said subscriber side through one or more Line Terminals and at least one equipment at said subscriber side being connected to said provider side through at least one Net Terminal, comprising the steps of supplying said communications network with power at least during a period of time through said at least one Net Terminal by means of said at least one equipment.

11. The method according to claim 10, further comprising supplying power during a power supply failure period.

12. The method according to claim 10, further comprising supplying power substantially continuously.

13. The method according to claim 10, comprising a further step of creating an attraction value for a subscriber of the communications network to connect a device for supplying the communications network.

* * * * *